United States Patent
Benny et al.

(10) Patent No.: US 9,923,732 B2
(45) Date of Patent: *Mar. 20, 2018

(54) VIRTUAL GATEWAYS AND IMPLICIT ROUTING IN DISTRIBUTED OVERLAY VIRTUAL ENVIRONMENTS

(71) Applicant: International Business Machines Corporation, Armonk, NY (US)

(72) Inventors: Stephan Benny, San Jose, CA (US); Uday S. Nagaraj, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/209,661

(22) Filed: Jul. 13, 2016

(65) Prior Publication Data
US 2016/0323121 A1 Nov. 3, 2016

Related U.S. Application Data

(63) Continuation of application No. 13/795,666, filed on Mar. 12, 2013, now Pat. No. 9,432,287.

(51) Int. Cl.
*H04L 12/56* (2006.01)
*H04L 12/46* (2006.01)
(Continued)

(52) U.S. Cl.
CPC ...... *H04L 12/4633* (2013.01); *H04L 12/4641* (2013.01); *H04L 12/66* (2013.01);
(Continued)

(58) Field of Classification Search
CPC . H04L 12/4633; H04L 12/4641; H04L 12/66; H04L 45/00
(Continued)

(56) References Cited

U.S. PATENT DOCUMENTS

| 6,426,944 B1 | 7/2002 | Moore |
| 7,188,364 B2 | 3/2007 | Volpano |

(Continued)

FOREIGN PATENT DOCUMENTS

| CN | 1447538 A | 10/2003 |
| CN | 1988544 A | 6/2007 |

(Continued)

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

(Continued)

*Primary Examiner* — Samina Choudhry
(74) *Attorney, Agent, or Firm* — Sherman IP LLP; Kenneth L. Sherman; Steven Laut

(57) ABSTRACT

A method includes encapsulating, by a first virtual switch, a packet from a first virtual machine (VM) into a tunneled packet by appending the packet with a tunnel header that is addressed for a second virtual switch, wherein the packet includes a first destination address for a virtual default gateway. The first virtual switch forwards an inner packet of the encapsulated packet to a second VM. The first virtual switch acts as a virtual default gateway based on replacement of a first destination address for the virtual default gateway with a second destination address for the second VM.

20 Claims, 7 Drawing Sheets

(51) Int. Cl.

| | |
|---|---|
| *H04L 12/715* | (2013.01) |
| *H04L 12/701* | (2013.01) |
| *H04L 12/66* | (2006.01) |
| *H04L 12/741* | (2013.01) |
| *H04L 12/931* | (2013.01) |
| *H04L 29/12* | (2006.01) |
| *H04L 29/06* | (2006.01) |

(52) U.S. Cl.
CPC .............. *H04L 45/00* (2013.01); *H04L 45/64* (2013.01); *H04L 45/74* (2013.01); *H04L 49/70* (2013.01); *H04L 61/2007* (2013.01); *H04L 69/16* (2013.01); *H04L 29/0653* (2013.01); *H04L 61/6022* (2013.01)

(58) Field of Classification Search
USPC ........................................................ 370/392
See application file for complete search history.

(56) References Cited

U.S. PATENT DOCUMENTS

| | | | |
|---|---|---|---|
| 7,424,019 | B1 | 9/2008 | Kopelman et al. |
| 7,478,173 | B1 | 1/2009 | Delco |
| 7,702,742 | B2 | 4/2010 | Tanaka et al. |
| 7,778,257 | B1 * | 8/2010 | Bishara ............... H04L 12/4633 370/400 |
| 7,885,276 | B1 | 2/2011 | Lin |
| 8,660,129 | B1 | 2/2014 | Brendel et al. |
| 8,665,706 | B2 | 3/2014 | Tan |
| 8,718,061 | B2 | 5/2014 | Chiueh et al. |
| 8,804,529 | B2 | 8/2014 | Bergamasco et al. |
| 8,892,706 | B1 | 11/2014 | Dalal |
| 8,923,155 | B2 * | 12/2014 | Qu ........................ H04L 45/74 370/252 |
| 2007/0064673 | A1 | 3/2007 | Bhandaru |
| 2009/0141729 | A1 | 6/2009 | Fan |
| 2009/0268614 | A1 | 10/2009 | Tay et al. |
| 2011/0051723 | A1 | 3/2011 | Rabie et al. |
| 2011/0141891 | A1 | 6/2011 | So |
| 2011/0283017 | A1 | 11/2011 | Alkhatib et al. |
| 2011/0299532 | A1 | 12/2011 | Yu et al. |
| 2011/0299537 | A1 | 12/2011 | Saraiya et al. |
| 2012/0063316 | A1 | 3/2012 | Ghanwani et al. |
| 2012/0093034 | A1 | 4/2012 | Kamath et al. |
| 2012/0173757 | A1 | 7/2012 | Sanden |
| 2012/0250682 | A1 | 10/2012 | Vincent et al. |
| 2012/0275328 | A1 | 11/2012 | Iwata et al. |
| 2012/0290703 | A1 | 11/2012 | Barabash et al. |
| 2013/0318219 | A1 * | 11/2013 | Kancherla ............... H04L 49/70 709/222 |
| 2014/0059111 | A1 | 2/2014 | Veeraiyan |
| 2014/0086253 | A1 | 3/2014 | Yong |
| 2014/0126418 | A1 | 5/2014 | Brendel et al. |
| 2014/0254603 | A1 | 9/2014 | Banavalikar et al. |
| 2014/0269321 | A1 | 9/2014 | Kabmle et al. |
| 2014/0269712 | A1 | 9/2014 | Kidambi |
| 2015/0281118 | A1 | 10/2015 | Banavalikar et al. |
| 2016/0234033 | A1 | 8/2016 | Banavalikar et al. |
| 2016/0241409 | A1 | 8/2016 | Ghanwani |
| 2016/0254927 | A1 | 9/2016 | Kidambi |

FOREIGN PATENT DOCUMENTS

| | | |
|---|---|---|
| CN | 101060454 A | 10/2007 |
| CN | 102549977 | 7/2012 |
| CN | 102835080 A | 12/2012 |
| CN | 102857416 A | 1/2013 |
| CN | 102882710 A | 1/2013 |
| CN | 102946354 A | 2/2013 |
| KR | 100865722 B1 | 10/2008 |
| WO | 2006099296 A3 | 9/2006 |

OTHER PUBLICATIONS

International Search Report and Written Opinion dated Jun. 30, 2014 for International Application No. PCT/CN2014/073012 from State Intellectual Property Office of the P.R. China, pp. 1-10, Beijing, China.

Birman, K.P., "Technology Challenges for Virtual Overlay Networks", IEEE Transactions on Systems, Man and Cybernetics, Part A: Systems and Humans, Jul. 2001, pp. 319-327, vol. 31, No. 4, IEEE, USA.

Recio, R., "Distributed Overlay Virtual Ethernet (DOVE) Networks", PowerPoint Presentation, 2012, Slides 1-27, IBM Corporation, USA.

International Search Report and Written Opinion dated Jun. 17, 2014 for International Application No. PCT/CN2014/073118 from State Intellectual Property Office of the P.R.China (ISA/CN), pp. 1-11, Beijing, China.

Iwata, A. et al., "Global Open Ethernet Architecture for a Cost-Effective Scalable VPN Solution", IEICE Transactions Communication, Jan. 2004, pp. 142-151, vol. E87-B, No. 1, Institute of Electronics, Information, and Communication, Japan.

Anonymous, "Intelligent MCs Debunk Perceptions", Communications News, Oct. 2004, pp. 2, 42, & 44, vol. 41, No. 10, Nelson Publishing, Inc., USA.

Cisco Corporation, "Routing Between VLANs Overview", Cisco IOS Switching Services Configuration Guide, 2010, pp. XC-302-XC-312, Cisco Corporation, USA.

Andersen, D.G., "Improving End-to-End Availability Using Overlay Networks", Doctoral Thesis in Computer Science and Engineering, Feb. 2005, pp. 1-150, Massachusetts Institute of Technology, USA.

Mao, Y. et al., "MOSAIC: Unified Platform for Dynamic Overlay Selection and Composition", University of Pennsylvania CIS Technical Report, pp. 1-14, University of Pennsylvania, USA.

Mao, Y. et al., "MOSAIC: Multiple Overlay Selection and Intelligent Composition", University of Pennsylvania CIS Technical Report, 2007, pp. 1-14, University of Pennsylvania, USA.

Patel, B.V. et al., "An Architecture and Implementation Toward Multiprotocol Mobility", IEEE Personal Communications, Jun. 1995, pp. 32-42, vol. 2, No. 3, IEEE, USA.

Anonymous, "IEEE Standards for Local and metropolitan area networks—Virtual Bridged Local Area Networks" IEEE Std 802.1Q, 2003 Edition, pp. 1-152, United States.

Edwards, A. et al., "Diverter: A New Approach to Networking Within Virtualized Infrastructures", Proceedings of the First ACM Workshop on Research on Enterprise Networking (WREN '09), Aug. 2009, pp. 103-110, ACM, USA.

U.S. Non-Final Office Action for U.S. Appl. No. 13/840,492 dated Jan. 5, 2015.

U.S. Notice of Allowance for U.S. Appl. No. 13/840,492 dated Apr. 10, 2015.

U.S. Non-Final Office Action for U.S. Appl. No. 13/795,666 dated Jan. 22, 2015.

U.S. Final Office Action for U.S. Appl. No. 13/795,666 dated Jul. 17, 2015.

U.S. Advisory Action for U.S. Appl. No. 13/795,666 dated Sep. 18, 2015.

U.S. Non-Final Office Action for U.S. Appl. No. 13/795,666 dated Oct. 27, 2015.

U.S. Notice of Allowance for U.S. Appl. No. 13/795,666 dated May 20, 2016.

U.S. Non-Final Office Action for U.S. Appl. No. 13/831,215 dated Aug. 25, 2014.

U.S. Final Office Action for U.S. Appl. No. 13/831,215 dated Dec. 9, 2014.

U.S. Notice of Allowance for U.S. Appl. No. 13/831,215 dated Feb. 22, 2016.

U.S. Non-Final Office Action for U.S. Appl. No. 13/791,719 dated Sep. 24, 2014.

U.S. Notice of Allowance for U.S. Appl. No. 13/791,719 dated Feb. 17, 2015.

U.S. Corrected Notice of Allowability for U.S. Appl. No. 13/791,719 dated Mar. 12, 2015.

(56) References Cited

OTHER PUBLICATIONS

U.S. Corrected Notice of Allowability for U.S. Appl. No. 13/791,719 dated Apr. 29, 2015.
U.S. Notice of Allowance for U.S. Appl. No. 14/689,915 dated Mar. 1, 2016.
U.S. Corrected Notice of Allowability for U.S. Appl. No. 14/689,915 dated Mar. 25, 2016.
U.S. Corrected Notice of Allowability for U.S. Appl. No. 14/689,915 dated May 18, 2016.
U.S. Notice of Allowance for U.S. Appl. No. 15/123,092 dated Apr. 24, 2017.
U.S. Notice of Allowance for U.S. Appl. No. 15/152,471 dated Nov. 9, 2016.
U.S. Non-Final Office Action for U.S. Appl. No. 15/132,092 dated Oct. 5, 2016.
U.S. Non-Final Office Action for U.S. Appl. No. 15/152,471 dated Aug. 12, 2016.

* cited by examiner

VIRTUAL GATEWAYS AND IMPLICIT ROUTING IN DISTRIBUTED OVERLAY VIRTUAL ENVIRONMENTS

BACKGROUND

Overlay network clients, such as Virtual Machines (VMs), need default gateways to provide routing functionality. In overlay networks, the data link layer (layer 2 of the Open Systems Interconnection (OSI) model (ISO/IEC 7498-1)) is concerned with moving data across the physical links in the network. In a network, the switch is a device that redirects data messages at the layer 2 level, using the destination Media Access Control (MAC) address to determine where to direct the message. Layer 2 contains two sublayers: the MAC sublayer and the logical link control (LLC) sublayer. Layer 2 ensures that an initial connection has been set up, divides output data into data frames, and handles the acknowledgements from a receiver that the data arrived successfully.

In overlay networks, the virtual switches (VSs) to which the VMs connect provide only layer 2 networking functionality, which renders them unsuitable for deployment in overlay networks. The only situation where present VSs can be deployed in overlay networks is if the entire overlay is considered as one large layer 2 domain. This will make segregation of clients into internet protocol (IP) subnets impossible. Additionally, this will severely restrict the ability of overlay clients to talk to non-overlay devices, due to the explosion of address resolution protocol (ARP) entries on the clients.

BRIEF SUMMARY

Embodiments relate to providing default gateway virtualization in a distributed overlay virtual environment. One embodiment includes a method that comprises encapsulating, by a first virtual switch, a packet from a first virtual machine (VM) into a tunneled packet by appending the packet with a tunnel header that is addressed for a second virtual switch, wherein the packet includes a first destination address for a virtual default gateway. The first virtual switch forwards an inner packet of the encapsulated packet to a second VM. The first virtual switch acts as a virtual default gateway based on replacement of a first destination address for the virtual default gateway with a second destination address for the second VM.

These and other features, aspects, and advantages of the present invention will become understood with reference to the following description, appended claims, and accompanying figures.

DETAILED DESCRIPTION

Figure 1:
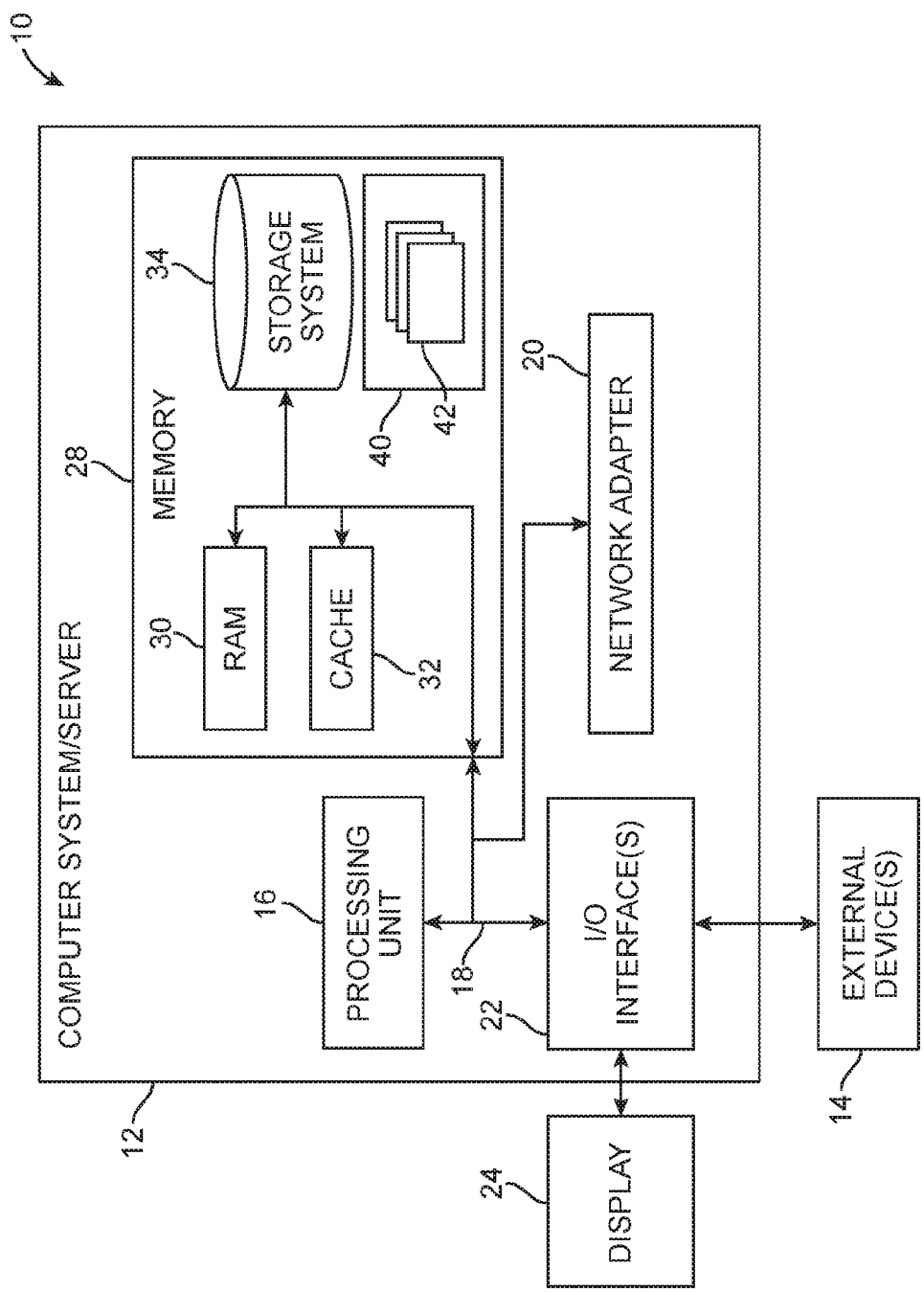
FIG. 1 depicts a cloud computing node, according to an embodiment of the present invention.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example and not limitation, such architectures include a(n) Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile/non-volatile media, and removable/non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in a memory 28 by way of example and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14, such as a keyboard, a pointing device, etc.; a display 24; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks, such as a local area network (LAN), a general wide area network (WAN), and/or a public network (e.g., the Internet) via a network adapter 20. As depicted, the network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, data archival storage systems, etc.

Figure 2:
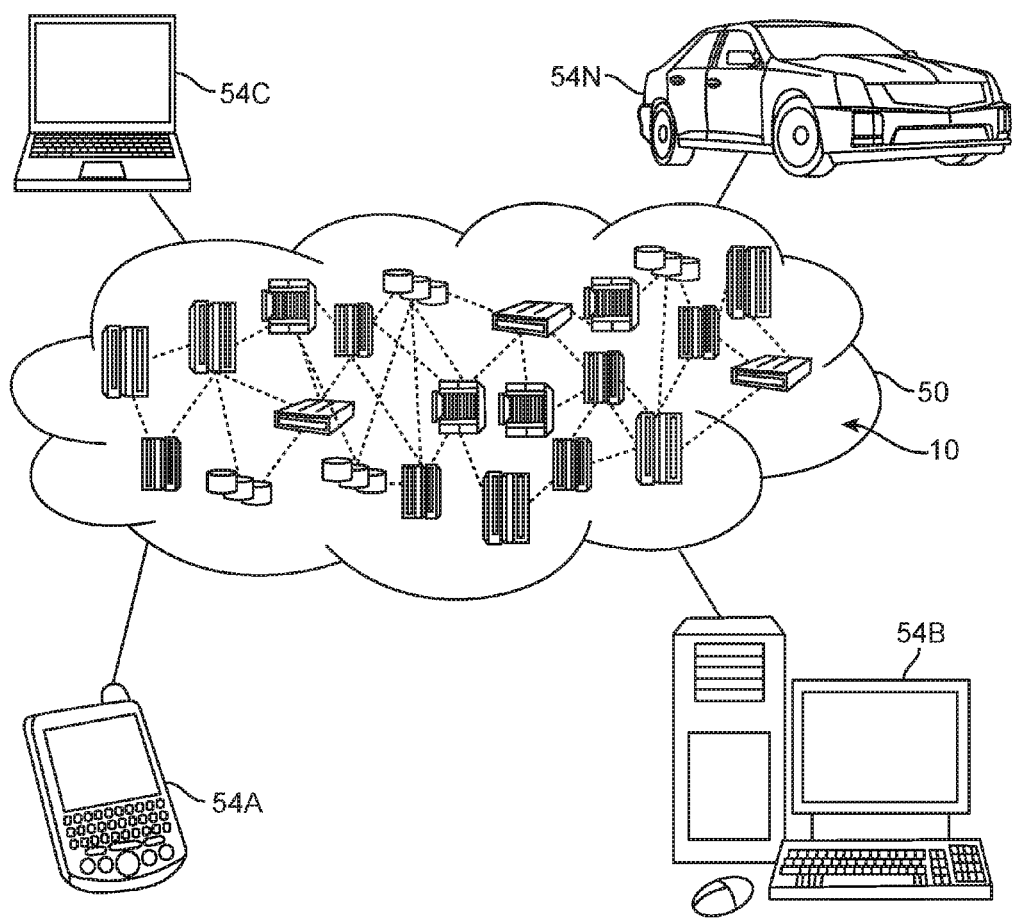
FIG. 2 depicts a cloud computing environment, according to an embodiment of the present invention.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
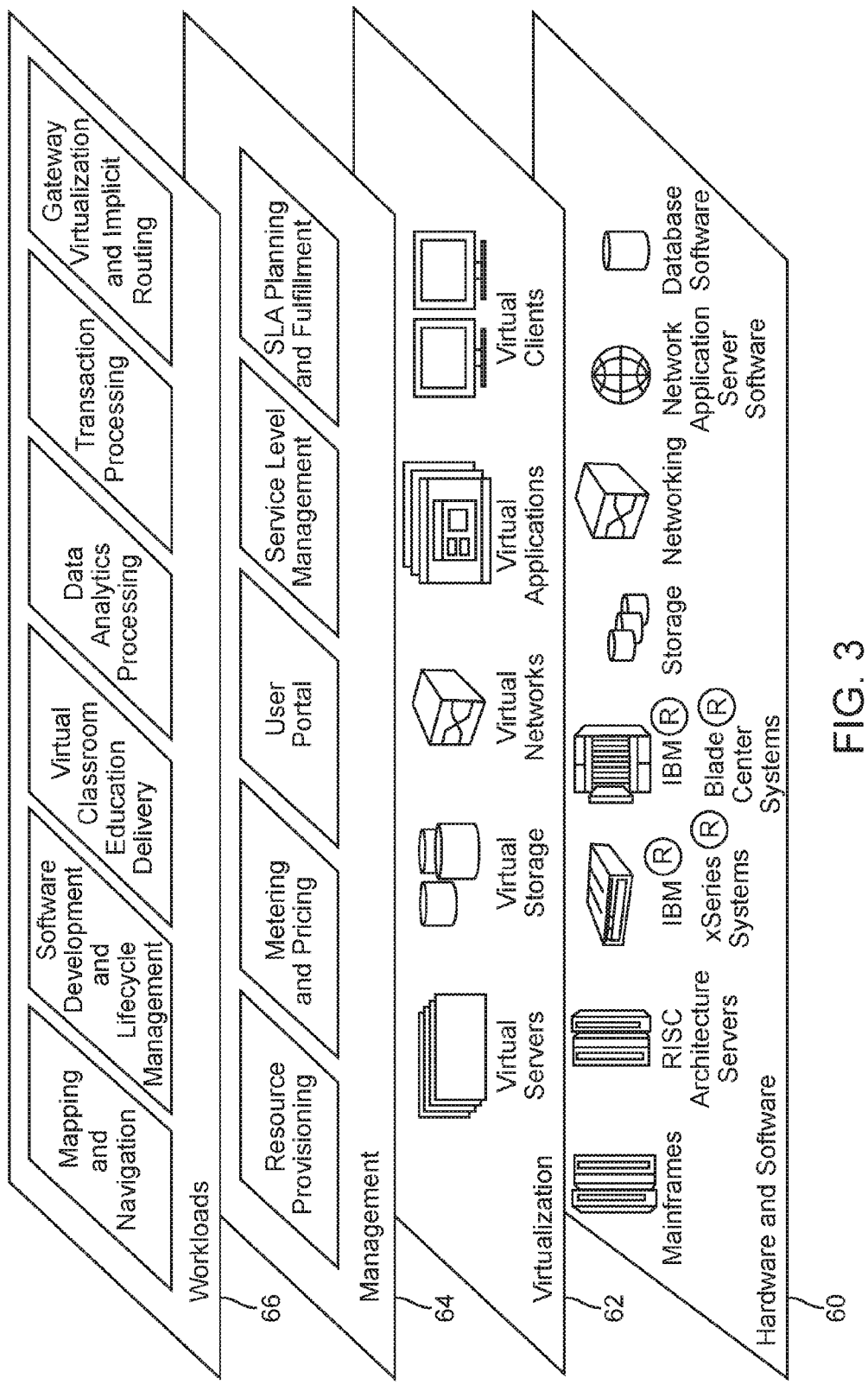
FIG. 3 depicts a set of abstraction model layers, according to an embodiment of the present invention.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 includes hardware and software components. Examples of hardware components include mainframes. In one example, hardware components comprise IBM® zSeries® systems and RISC (Reduced Instruction Set Computer) architecture-based servers. In one example, hardware components comprise IBM pSeries® systems, IBM xSeries® systems, IBM BladeCenter® systems, storage devices, networks, and networking components. Examples of software components include network application server software. In one example, software components comprise IBM WebSphere® application server software and database software. In one example, software components comprise IBM DB2® database software. (IBM, zSeries, pSeries, xSeries, BladeCenter, WebSphere, and DB2 are trademarks of International Business Machines Corporation registered in many jurisdictions worldwide.)

A virtualization layer 62 provides an abstraction layer from which the following examples of virtual entities may be provided: virtual servers; virtual storage; virtual networks, including virtual private networks; virtual applications and operating systems; and virtual clients.

In one example, a management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment and provide billing or invoicing for consumption of these resources. In one example, these resources may comprise application software licenses. Security provides identity verification for cloud consumers and tasks as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

A workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and gateway virtualization and implicit routing. As mentioned above, all of the foregoing examples described with respect to FIG. 3 are illustrative only, and the invention is not limited to these examples.

It is understood all functions of the present invention as described herein are typically performed by the system 400 (FIG. 4) or the system 600 (FIG. 6), which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

Embodiments of the invention relate to providing default gateway virtualization in a distributed overlay virtual environment. One embodiment includes a method that comprises creating a packet by a first virtual machine (VM) including a first destination address. The packet is received from the first VM by a first virtual switch. A second destination address for a second VM is obtained by the first virtual switch based on information in the packet. The first destination address in the packet is replaced with the second destination address. The packet is encapsulated using a header that is addressed for a second virtual switch.

Figure 4:
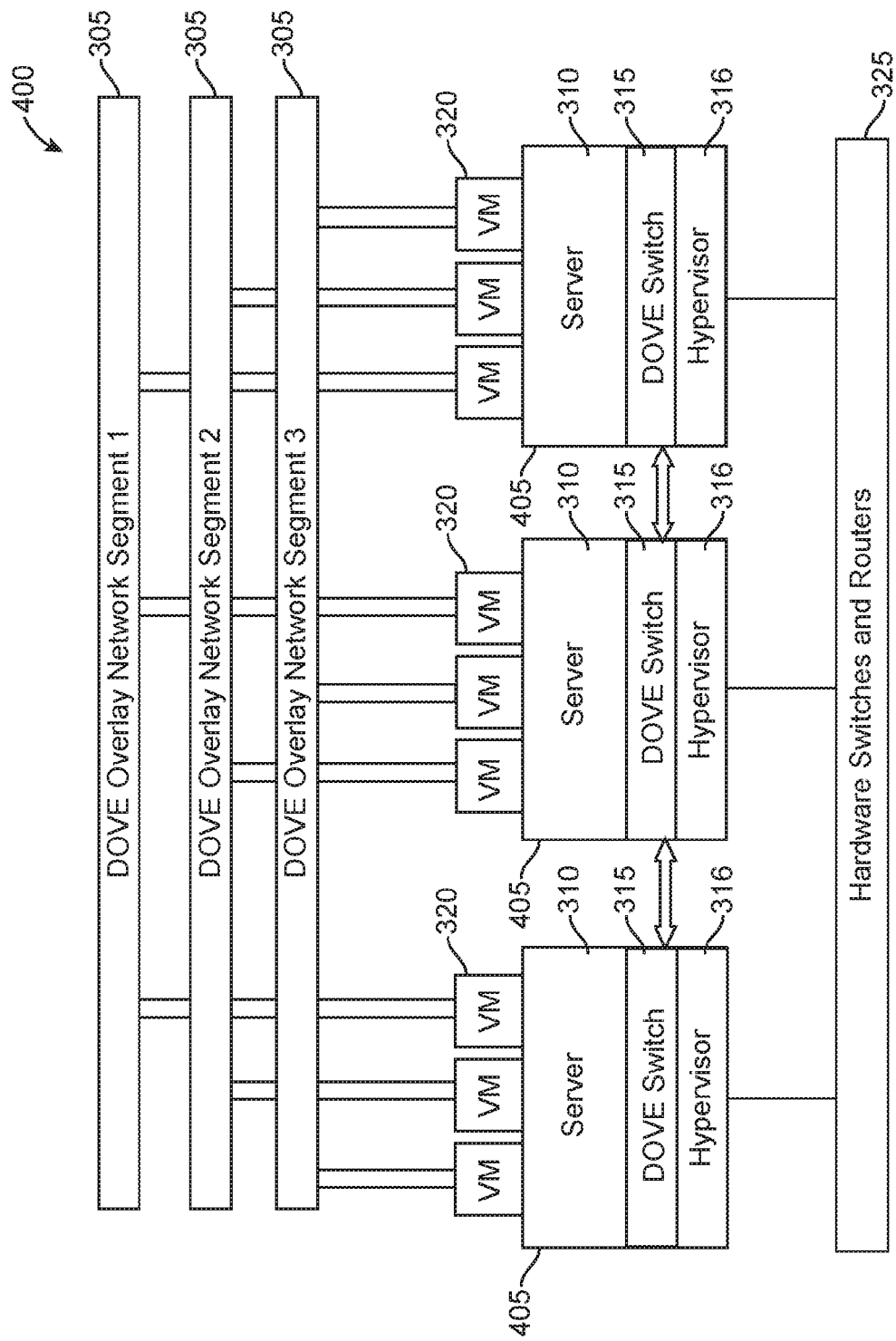
FIG. 4 is a block diagram illustrating a distributed overlay virtual environment for employing an embodiment of the present invention.

FIG. 4 shows a block diagram illustrating a distributed overlay virtual environment 400 for employing an embodiment of the present invention. In one embodiment, the distributed overlay virtual environment 400 may comprise a distributed overlay virtual Ethernet (DOVE) network system. The distributed overlay virtual environment 400 includes multiple virtual systems (or networks) 405 (also known as DOVE modules in one embodiment), each comprising a server 310 (or host) with a virtual switch 315, hypervisor 316 and VMs 320, which overlay a physical layer 325 (e.g., including physical hardware and software processes) that may include physical switches, routers, servers, gateways, firewalls, etc. The physical layer 325 may also be referred to as the under layer. In one embodiment, overlay network segments 1-N 305 (e.g., overlay network segments 1-3) connect the multiple systems for communication of the different elements (e.g., hypervisors 316, VMs 320), where N is a positive number (e.g., 2, 3, 5, 10, etc.). The overlay network segments 1-N 305 may connect the different DOVE modules 405 as part of one or more subnets. It should be noted that while three systems 405 are shown, more (or less) systems 405 may be included in the distributed overlay virtual environment 400. In one embodiment, the virtual switches 315 comprise DOVE switches.

In one embodiment, the overlay network segments 1-N 305 create overlay networks between the hypervisors 316 and use encapsulation of packets, where packets originating from one VM 320 are encapsulated (e.g., adding overlay and physical network headers, e.g., tunnel headers) and the physical layer 325 (underlay) is used to deliver to a server 310 where the target VM 320 resides. In one embodiment, in the physical layer 325 an outer header is used by physical switches to forward packets, where an overlay identification (ID) in an encapsulation header provides traffic isolation. Incoming packets to a virtual switch 315 of a destination server 310 are decapsulated (e.g., the encapsulation headers are stripped from the packet) and delivered to a destination VM 320. In one embodiment, address independence between different virtual systems 405 is supported. For example, two different VMs 320 operating in two different systems 405 may have the same IP address and media access control (MAC) address. In another embodiment, two different VMs 320 operating in two different systems 405 may have a different IP address and a different media access control (MAC) address. As another example, the systems 405 support deploying VMs 320, which belong to the same system 405, to different hosts that are located in different physical subnets (includes switches and/or routers between the physical entities). In another embodiment, VMs 320 belonging to different systems 405 may be hosted on the same physical host. In yet another embodiment, the systems 405 support VM 320 migration anywhere in a data center without changing the VM 320 network address and losing its network connection.

In one embodiment, the systems 405 encapsulate data with physical path translations based upon policies (e.g., from a distributed policy service (DPS)), and send the encapsulated data between systems 405 that, in turn, is decapsulated and forwarded to a destination VM 320. In one embodiment, the policies describe, in a logical manner, how data is required to be sent over virtual networks without details of the underlying physical entities that perform particular tasks.

In one embodiment, the hypervisors 316 (e.g., VM 320 managers) allow multiple operating systems (e.g., VMs, such as VMs 320) to run concurrently on a host computer. A hypervisor 316 provides abstraction of physical resources to the VMs 320. For example, a physical network interface card (NIC) may be abstracted as a virtual NIC (vNIC) of a system 405. In one embodiment, a virtual switch 315 is a software abstraction of an Ethernet switch in the hypervisor 316 for providing connectivity for VMs 320.

In typical overlay networks, a default gateway is a device that passes traffic from a local subnet to devices on other subnets. The default gateway often connects a local network to the Internet, although internal gateways for local networks may also exist. On home or small business networks with a broadband router to share the Internet connection, the home router serves as the default gateway. On home or small business networks without a router, such as for residences with dialup Internet access, a router at the Internet Service Provider location serves as the default gateway. Default network gateways can also be configured using an ordinary computer instead of a router. These gateways use two network adapters, one connected to the local subnet and one to the outside network. Either routers or gateway computers can be used to network local subnets such as those in larger networks.

In one embodiment, the present invention "creates" a virtual default gateway using virtual switches 315 and use implicit routing of communications, which is the ability of the virtual gateway to perform all routing actions necessary and also prepare a packet from a VM 320 for final delivery. In one embodiment, users may specify the default gateway IP address and possibly a MAC address to be used. When VMs 320 use address resolution protocol (ARP) for their default gateway, in one embodiment, the virtual switches 315 to whom they connect will respond, irrespective of the virtual switch 315 to which the VM 320 connects. It should be noted that ARP maps addresses between the data link layer and the network layer of the overlay network.

Figure 5:
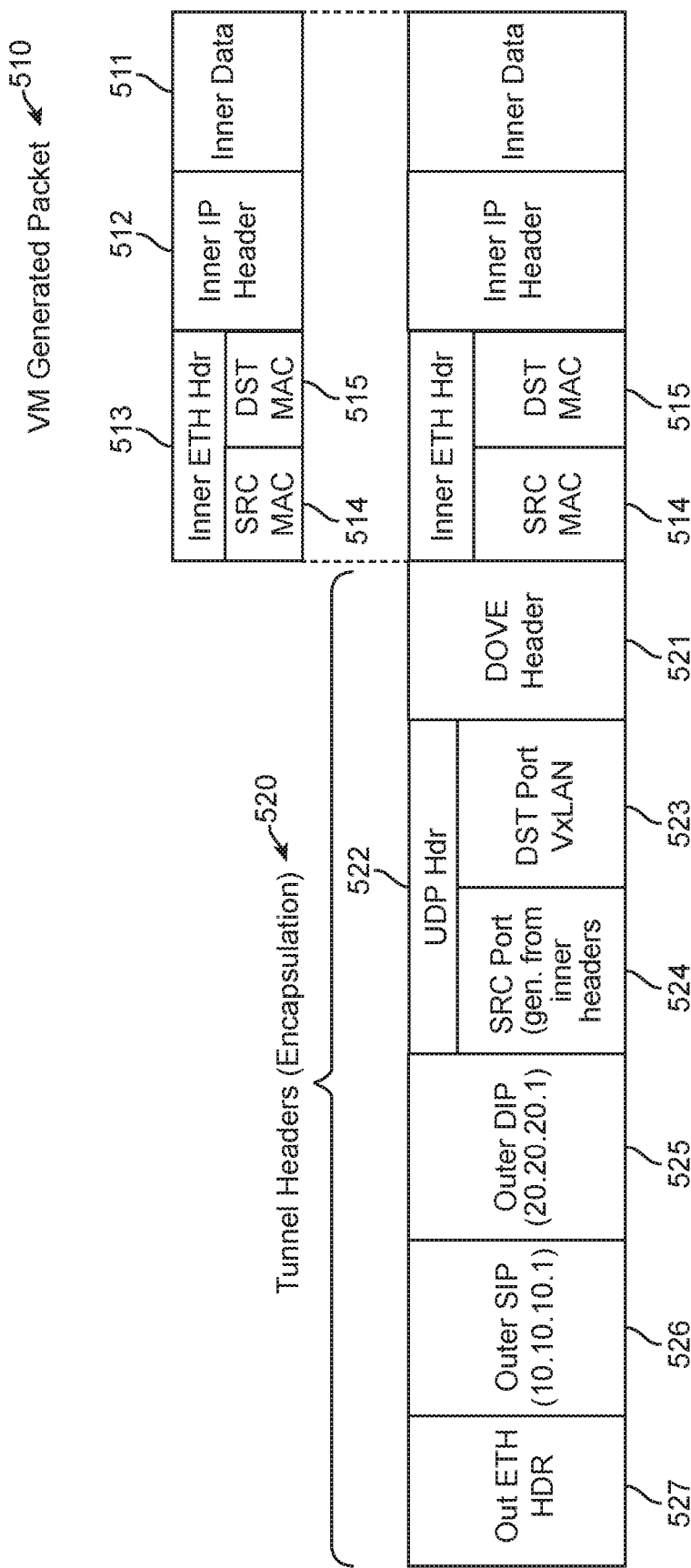
FIG. 5 illustrates an encapsulation format that may be used, in accordance with an embodiment of the invention.

FIG. 5 illustrates an example encapsulation format that may be used, in accordance with an embodiment of the invention. In one embodiment, an original packet 510 may comprise an inner Ethernet header 513 including a source MAC address 514 and a destination MAC address 515, an inner IP header 512 (including an IP address) and inner data 511 (i.e., payload information). The original packet 510 is desired to be communicated from one VM 320 to another VM 320. In one embodiment, the original packet 510 is encapsulated by a system 405 by adding tunnel (encapsulation) formatted fields 520, such as an outer Ethernet header 527 (e.g., MAC address), outer source IP address 526, outer destination IP address 525, user datagram protocol (UDP) header 522 including a source port 524 (generated from inner headers) and destination port 523 (e.g., for VxLAN), and the DOVE header 521 (e.g., also known as an encapsulation protocol (EP) header). In one embodiment, the DOVE header 521 may comprise a format for a specific EP type, such as VxLAN, NVGRE, etc. In one embodiment, each virtual switch 315 supports specific tunneling translation EP formats. If an encapsulated packet is sent to a VM 320 associated with a virtual switch 315 that doesn't support the EP type for the encapsulated packet, the packet must formatted or translated (e.g., by a translation gateway) with an EP type that it can process.

In one embodiment, traffic from the VMs 320 (e.g., clients) is encapsulated within an IP tunnel and transmitted through the underlay network (e.g., physical network 325). Traffic in the underlay network follows normal networking paradigms (switching/routing based on MAC/IP addresses. Time-to-live (TTL) decrements, policy enforcement, etc.). Traffic from the overlay networks 405 is viewed as a payload in the underlay network and not used for any forwarding decisions. In one embodiment, VMs 320 in the overlay networks 405 have no knowledge of encapsulation being performed on the original VM packet 510. The VMs 320 continue to operate with knowledge of their respective IP addresses, IP subnets and default gateways that perform routing. In one example, if a source VM 320 with an IP address 10.10.10.10/24 needs to send an Ethernet packet 510 to a destination VM 320 with IP address of 20.20.20.10/24, the source VM 320 would forward the packet to its configured default gateway, and expect the gateway to perform the routing and forwarding. In one embodiment, the default gateway is a virtual default gateway where the virtual switch 315 of the source VM 320 in which the source and destination VMs 320 connect.

In one embodiment, the virtual switch 315 performs the routing necessary to deliver the source VM's 320 traffic to a destination VM 320. In one embodiment, the destination MAC address 515 (which was the gateway MAC address) is replaced with the destination VM's 320 MAC address. In one embodiment, TTL decrement is performed in the IP header of the packet. In one embodiment, the source virtual switch 315 encapsulates the resulting Ethernet packet into a tunneled packet and forwards the encapsulated packet to the underlay network 325. In one embodiment, the encapsulated packet is the packet that is delivered to the destination VM 320. In one embodiment, no further inner packet modifications are necessary, which is the idea behind implicit routing. In one embodiment, the virtual gateway discussed herein is purely a virtual entity and is not located anywhere in the overlay/underlay network. In one embodiment, the virtual gateway is viewed as existing by the VMs 320 for satisfying the default gateway needs for the VMs 320 (clients).

Figure 6:
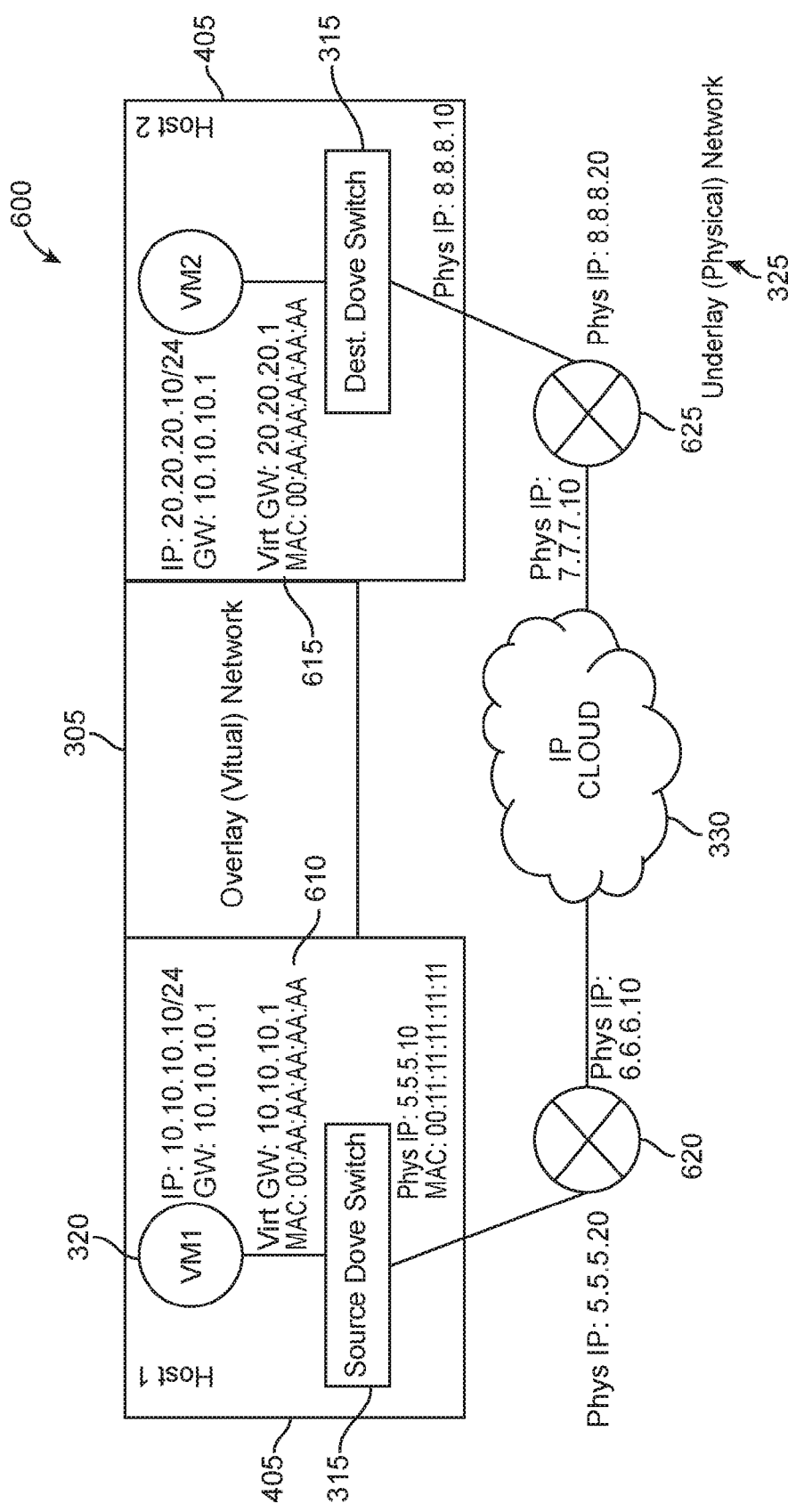
FIG. 6 is a block diagram illustrating a distributed overlay virtual environment for employing an embodiment of the present invention.

FIG. 6 illustrates a block diagram showing a distributed overlay virtual environment 600 for employing an embodiment of the present invention. In one embodiment, the MAC and IP addresses (e.g., 610, 615) do not exist on any physical device. In one embodiment, by replacing the MAC address of the default gateway with the destination VM's 320 (e.g., VM2) MAC address, the virtual switches 315 act as the virtual gateways. In the overlay virtual environment 600, the underlay physical layer 325 may include routers 620 and 625 on either side of a IP cloud 330. In one embodiment, example packets exchanged between VM1 320 and VM2 320 are discussed as follows. In one example embodiment, VM1 320 and VM2 320 appear to be in different subnets to each other, and VM1 320 and VM2 320 will attempt to send their respective packets to the configured default gateway. In one example, for the VM1 320 the MAC address for the default gateway is 10.10.10.1 and for the VM2 320 the default gateway MAC address is 20.20.20.1. The destination MAC used will be 00:AA:AA:AA:AA:AA for both the VM1 320 and the VM2 320.

In one embodiment, the virtual switches (e.g., DOVE switches) that receive the packets from the VM1 320 and the VM2 320 detect that the packets are addressed to the default gateway by examining the destination MAC address in the packet. In one embodiment, the virtual switches 315 then determine the location of the destination VM 320 (and the destination VM 320 MAC address) based on the destination IP address of the original formatted packet (e.g., formatted packet 510). In one embodiment, the virtual switch 315 then replaces the VM 320 destination MAC address of the original packet with the retrieved MAC address (e.g., retrieved from a response from a DOVE connectivity service (DCS) query). In one embodiment, the virtual switch 315 prepends (encapsulates) a tunnel IP header on the packet that is addressed to the final location (i.e., the destination virtual switch 315) and forwards the packet to the physical network 325. In one embodiment, as part of the routing decisions, the IP header of the VM 320 packet may be modified due to TTL decrement.

In one embodiment, the physical network 325 forwards the packet through the IP cloud 330 based on the tunnel header destination information and considers the original VM 320 packet (which has been modified) as payload. In one embodiment, once the packet reaches the destination virtual switch 315, the tunnel headers (e.g., tunnel headers 520) are stripped off (decapsulated). The inner packet (e.g., packet 510) is then forwarded unchanged to the destination VM2 320.

In one embodiment, virtual gateways need to be configured (e.g., as to appear to the VMs 320 as properly configured). In one embodiment, the configuration of the virtual gateway may be static (e.g., a table that resides on a server). In another embodiment, the virtual gateways may be configured as part of a dynamic host configuration protocol (DHCP) configuration on a server. In one embodiment, the virtual (DOVE) switches 315 that connect to VMs 320 intercept the DHCP packets and "learn" the gateway configuration. The virtual switches 315 may then automatically start providing gateway functionality once the configuration of the gateways is completed.

In one embodiment, all of the virtual gateways may have the same MAC address. In one embodiment, since the gateways are virtual, and they exist only to satisfy the client's IP routing requirements (e.g., VMs 320), these entities may all share the same MAC address. In one embodiment, the IP addresses that are assigned to the VMs 320 will need to be distinct and will need to match the configured gateways in DHCP tables or static configurations. In one embodiment, the use of only one MAC address reduces the amount of configuration and facilitates VM 320 detection and troubleshooting.

In one embodiment, for the overlay network 600 clients (e.g., VMs 320), the entire network appears as a one hop network. In one embodiment, all destinations in the overlay appear at most one routing hop away, which is irrespective of how many underlay routing hops a tunneled packet traverses.

In one embodiment, the ARP table of clients (e.g., VMs 320) may have a static configuration for the gateway IP's ARP. In one embodiment, since all gateways share the same MAC address, this reduces the need for processing ARPs for the gateway. In one embodiment, routing is performed at the first virtual (DOVE) switch 315. The virtual switch 315 to which a VM 320 connects acts as the default gateway, and performs all necessary routing steps and prepares the packet for final delivery to overlay destinations. In one embodiment, the virtual switches 315 to which destination VMs 320 connect may forward the packets based on the MAC address only, where no further packet modifications are required.

Figure 7:
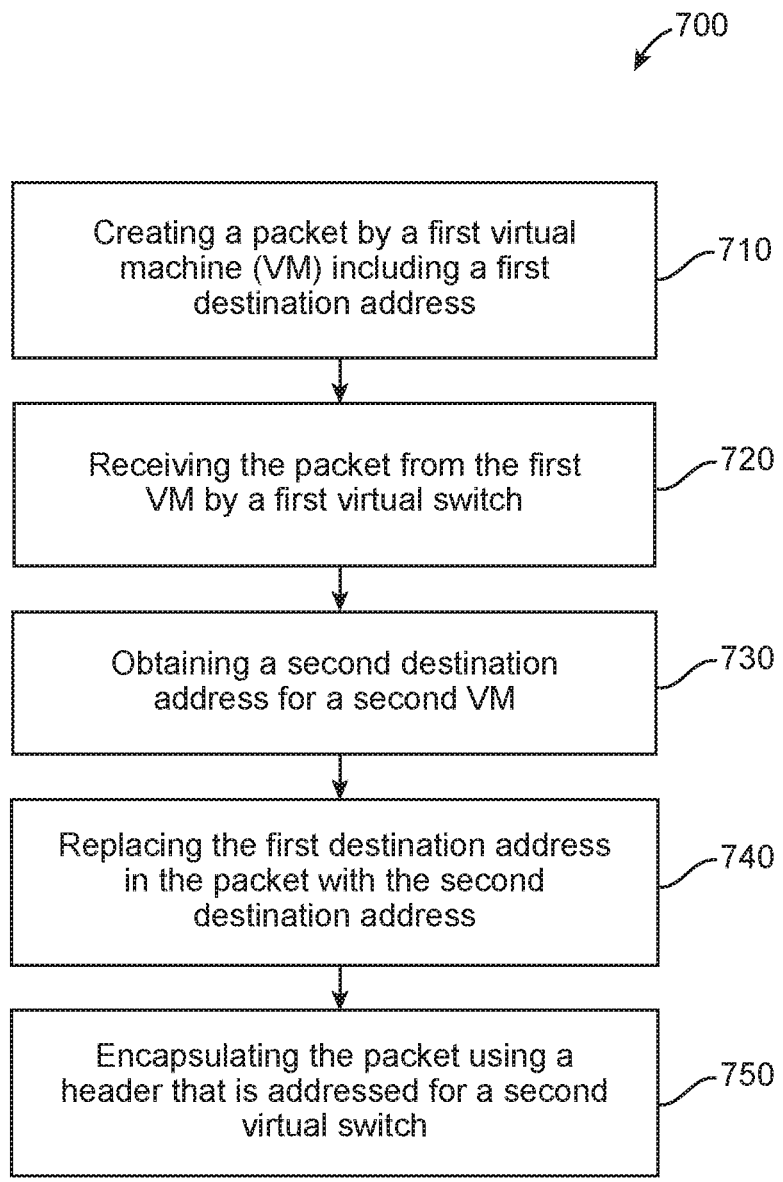
FIG. 7 is a block diagram showing an example process for default gateway virtualization, in accordance with an embodiment of the invention.

FIG. 7 is a block diagram showing an example process 700 for default gateway virtualization, in accordance with an embodiment of the invention. In one embodiment, process block 710 provides creating a packet by a first VM (e.g., VM1 320, FIG. 6) including a first destination address (e.g., a MAC address for a default gateway). Block 720 provides receiving the packet from the first VM by a first virtual switch (e.g., a source virtual switch 315). Process block 730 provides obtaining a second destination address (e.g., an MAC address) for a second VM (e.g., VM2 320, FIG. 6). Process block 740 provides replacing the first destination address in the packet with the second destination address. Process block 750 provides for encapsulating the packet using a header (e.g., tunnel header) that is addressed for a second virtual switch (e.g., destination virtual switch 315, FIG. 6).

In one embodiment, process 700 may further provide forwarding the encapsulated packet through a physical underlay layer (e.g., physical layer 325, FIG. 4, FIG. 6) to the second virtual switch, decapsulating the header from the encapsulated packet by the second virtual switch, and forwarding the decapsulated packet to the second VM (e.g., destination VM). In one embodiment, the process 700 uses the virtual switches for providing virtualization of a default gateway of the VMs based on the replacement of the MAC address for the default gateway with MAC address for the second VM.

The systems 400 and 600 may include one or more source programs, executable programs (object code), scripts, or any other entity comprising a set of computer program instructions to be performed. When the systems 400 and 500 include a source program, then the program is usually translated via a compiler, assembler, interpreter, or the like, which may or may not be included within a storage device. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In one embodiment, where the systems 400 and 600 are implemented in hardware, the systems 400 and 600 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method comprising:
    encapsulating, by a first virtual switch, a packet from a first virtual machine (VM) into a tunneled packet by appending the packet with a tunnel header that is addressed for a second virtual switch, wherein the packet includes a first destination address for a virtual default gateway; and
    forwarding, by the first virtual switch, an inner packet of the encapsulated packet to a second VM,
    wherein the first virtual switch acts as a virtual default gateway based on replacement of a first destination address for the virtual default gateway with a second destination address for the second VM, the first VM and the second VM are part of a distributed overlay virtual Ethernet (DOVE) network, and a plurality of virtual gateways in the DOVE network share a same MAC address.

2. The method of claim 1, wherein the first destination address comprises a media access control (MAC) address for the virtual default gateway.

3. The method of claim 2, further comprising:
    receiving, by the first virtual switch, the packet;
    obtaining, by the first virtual switch, a second destination address for the second VM based on information in the packet; and
    replacing, by the first virtual switch, the first destination address for the virtual default gateway in the packet with the second destination address for the second VM.

4. The method of claim 3, wherein all virtual gateways in the DOVE network share the same MAC address, and use of the same MAC address reduces amount of configuration and facilitates VM detection and troubleshooting.

5. The method of claim 4, wherein all destinations in the DOVE network appear as one routing hop away irrespective of how many underlay routing hops a tunneled packet traverses.

6. The method of claim 5, wherein an address resolution protocol (ARP) table of VMs has a static configuration for a gateway Internet Protocol ARP.

7. The method of claim 6, wherein the tunnel header of the encapsulated packet comprises an Ethernet header, a user datagram protocol (UDP) header, and a DOVE header.

8. A computer program product comprising a non-transitory computer readable storage medium having program code embodied therewith, the program code being executable by a first switch to implement a method comprising:
    encapsulating, by the first virtual switch, a packet from a first virtual machine (VM) into a tunneled packet by appending the packet with a tunnel header that is addressed for a second virtual switch, wherein the packet includes a first destination address for a virtual default gateway; and
    forwarding, by the first virtual switch, an inner packet of the encapsulated packet to a second VM,
    wherein the first virtual switch acts as a virtual default gateway based on replacement of a first destination address for the virtual default gateway with a second destination address for the second VM, the first VM and the second VM are part of a distributed overlay virtual Ethernet (DOVE) network, and a plurality of virtual gateways in the DOVE network share a same MAC address.

9. The computer program product of claim 8, wherein the first destination address comprises a media access control (MAC) address for the virtual default gateway.

10. The computer program product of claim 9, wherein the method further comprising:
    receiving, by the first virtual switch, the packet;
    obtaining, by the first virtual switch, a second destination address for the second VM based on information in the packet; and
    replacing, by the first virtual switch, the first destination address for the virtual default gateway in the packet with the second destination address for the second VM.

11. The computer program product of claim 10, wherein all virtual gateways in the DOVE network share the same MAC address, and use of the same MAC address reduces amount of configuration and facilitates VM detection and troubleshooting.

12. The computer program product of claim 11, wherein all destinations in the DOVE network appear as one routing hop away irrespective of how many underlay routing hops a tunneled packet traverses.

13. The computer program product of claim 12, wherein an address resolution protocol (ARP) table of VMs has a static configuration for a gateway Internet Protocol ARP.

14. The computer program product of claim 13, wherein the tunnel header of the encapsulated packet comprises an Ethernet header, a user datagram protocol (UDP) header, and a DOVE header.

15. A method comprising:
    encapsulating, by a source virtual switch, a packet from a source virtual machine (VM) by appending the packet with a tunnel header that is addressed for a destination virtual switch, wherein the packet is an inner packet of the encapsulated packet; and forwarding, by the source virtual switch, the inner packet of the encapsulated packet to a destination VM, wherein the source virtual switch acts as a virtual default gateway based on replacement of a media access control (MAC) address for the virtual default gateway with a MAC address for the destination VM, the source VM and the destination VM are part of a distributed overlay virtual Ethernet (DOVE) network, and a plurality of virtual gateways in the DOVE network share a same MAC address.

16. The method of claim 15, further comprising:

receiving, by the source virtual switch, the packet including the MAC address for the default virtual gateway;

obtaining, by the source virtual switch, the MAC address for the destination VM based on an internet protocol (IP) address in the packet; and replacing, by the source virtual switch, the MAC address for the virtual default gateway in the packet with the MAC address for the destination VM, wherein the source VM and the destination VM appear as part of different subnets from one another in the DOVE network.

17. The method of claim 16, wherein all virtual gateways in the DOVE network share the same MAC address, and use of the same MAC address reduces amount of configuration and facilitates VM detection and troubleshooting.

18. The method of claim 17, wherein all destinations in the DOVE network appear as one routing hop away irrespective of how many underlay routing hops a tunneled packet traverses.

19. The method of claim 18, wherein an address resolution protocol (ARP) table of VMs has a static configuration for a gateway Internet Protocol ARP.

20. The method of claim 19, wherein the tunnel header of the encapsulated packet comprises an Ethernet header, a user datagram protocol (UDP) header, and a DOVE header.

* * * * *